United States Patent [19]

Sanders, Jr.

[11] 4,246,029

[45] Jan. 20, 1981

[54] DETERGENT RESISTANT VINYL COATINGS

[75] Inventor: Albert J. Sanders, Jr., Toledo, Ohio

[73] Assignee: SWS Silicones Corporation, Adrian, Mich.

[21] Appl. No.: 15,693

[22] Filed: Feb. 27, 1979

[51] Int. Cl.$^3$ ............................................. C09G 1/14
[52] U.S. Cl. .................................. 106/3; 106/287.13; 428/447; 428/551
[58] Field of Search ............... 252/351; 106/3, 287.11; 428/447, 551

[56] References Cited

U.S. PATENT DOCUMENTS

| | | | |
|---|---|---|---|
| 3,527,723 | 9/1970 | Strutl et al. | 106/8 |
| 3,931,079 | 1/1976 | Wise et al. | 106/8 |
| 3,959,530 | 5/1976 | Kalardos | 106/5 |
| 3,960,575 | 6/1976 | Martin | 106/287.11 |

OTHER PUBLICATIONS

Chem. Abst.:85:194,176K.

*Primary Examiner*—Theodore Morris

[57] ABSTRACT

An improved detergent resistant vinyl coating composition containing an aqueous emulsion of (1) a mixture of silicone fluids consisting of (a) an aminofunctional silicone fluid and (b) an organopolysiloxane fluid and (2) a mixture of surface-active agents. The resultant composition has good shelf stability and when applied to vinyl surfaces, produces a high gloss coating which is resistant to detergents and environmental elements.

16 Claims, No Drawings

DETERGENT RESISTANT VINYL COATINGS

The present invention relates to detergent resistant coatings and more particularly to detergent resistant coatings for vinyl surfaces.

BACKGROUND OF THE INVENTION

Detergent resistant coatings, especially polish compositions are known in the art. For example, U.S. Pat. No. 3,960,575 to Martin describes detergent resistant polish compositions, in which an aminofunctional silicone fluid and hydroxyl-terminated organopolysiloxanes and/or silicone resins are added to polish compositions containing waxes. Also U.S. Pat. No. 3,508,933 to Yates describes an automobile polish which contains the reaction product of a hydroxyl terminated polydimethylsiloxane and an aminoalkoxysilane. U.S. Pat. No. 3,544,498 to Holdstock et al describes a detergent resistant polish containing a partial amine salt of a copolymer which is obtained from the partial hydrolysis and condensation of a silanol end-blocked polydimethylsiloxane having 5 siloxy units, an aminoalkyltrialkoxysilane and an aminoalkoxyalkyltrialkoxysilane and a copolymer obtained from the partial hydrolysis and condensation of a silanol end-blocked polydimethylsiloxane having 800 dimethylsiloxy units with an aminoalkoxyalkenyltrialkoxysilane. Also, U.S. Pat. No. 3,817,889 to Fink et al describes a detergent resistant composition containing hydroxyl-terminated organopolysiloxanes and methylsiloxanes having amine groups linked to the SiO groups of the methylsiloxanes through a bivalent hydrocarbon radical and an organic tin catalyst.

A preservative composition for rubber, vinyls and acrylics is described in U.S. Pat. No. 3,956,174 to Palcher in which an aqueous emulsion containing an unsubstituted or substituted dimethylpolysiloxane or mixtures thereof and polyol compounds is applied to the surfaces to be protected. After twenty-four hours, the surface is rewetted with the emulsion and allowed to penetrate as in the first application.

Many of the aqueous emulsions known heretofore do not have the desired shelf stability. For example, they have a tendency to separate upon storage and/or when subjected to freezing or elevated temperatures often result into what is referred to in the art as "breaking or creaming". This phenomena results in a non-uniform distribution of components throughout the emulsion which is particularly serious, especially in coating compositions where a uniform composition is essential in order to obtain optimum protection and appearance. Thus, emulsions which have a tendency to "break or cream" are generally ineffective and unsatisfactory as coating compositions.

Moreover, it is essential that the coating composition be detergent resistant and that it provides protection against the environment and that it imparts a high gloss to the treated surface. Furthermore, it is essential that the surface be resistant to detergents after only one application and that the surface retain its high gloss for a long period of time.

Thus the detergent resistant compositions of this invention will protect and restore the appearance of vinyl surfaces coated therewith. Moreover, these compositions will prevent deterioration of vinyl surfaces which are subjected to the elements of the environment, such as road film, dirt, water and grease. Furthermore, the coating compositions of this invention provide a water repellent film that reduces the effect of weathering which may cause embrittlement, cracking, discoloration or fading of the vinyl surface.

Therefore, it is an object of this invention to provide a detergent resistant composition for vinyl surfaces. Another object of this invention is to provide a composition which imparts a high gloss to the treated surface after only one application. Still another object of this invention is to provide a stable aqueous composition which will protect vinyl surfaces against the environment. A further object of this invention is to provide stable aqueous compositions which will protect vinyl surfaces against such elements as water, grease and dirt. A still further object of this invention is to provide stable aqueous compositions which will not "break or cream" after storing several months.

SUMMARY OF INVENTION

The foregoing objects and others which will become apparent from the following description are accomplished in accordance with this invention generally speaking, by providing a detergent resistant vinyl coating composition containing (1) a mixture of silicone fluids consisting of (a) an aminofunctional silicone fluid and (b) an organopolysiloxane fluid and (2) a mixture of nonionic surface-active agents consisting of (a) an octylphenoxy polyethoxy ethanol compound containing from 1 to 13 mols of ethylene oxide and (b) an ethylene oxide reaction product of nonyl phenol in which the ethylene oxide is reacted with nonyl phenol in a molar ratio of from 6:1 to 40:1 and the balance of the composition is (3) water. The silicone fluids (1) are present in the composition in an amount of from 1 to 50 percent by weight and the surface-active agents (2) are present in an amount of from 2 to 6 percent by weight based on the total weight of the composition, including water.

DETAILED DESCRIPTION OF THE INVENTION

Aminofunctional silicone fluids (a) employed in the aqueous emulsion of this invention may be prepared by equilibrating a mixture containing an organopolysiloxane and an aminofunctional silane or siloxane in the presence of an equilibration catalyst. Organopolysiloxanes which may be used in the preparation of these aminofunctional silicone fluids are cyclic siloxanes of the general formula

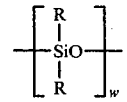

or linear or branched organopolysiloxanes having the general formula

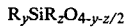

in which R represents monovalent hydrocarbon radicals having from 1 to 18 carbon atoms, y is a number of from about 0.5 to 3.0, z is a number of from 0.001 to 1 and the sum of y and z is a number of from 1 to 3.0 and w is a number of from 3 to 10.

Examples of suitable cyclic organopolysiloxanes which may be used in the formation of these aminofunctional silicone fluids are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Cyclic siloxanes in which w has a value of from 3 to 4 are preferred.

Examples of linear or branched chained siloxanes which may be used are triorganosiloxy end-blocked organopolysiloxanes such as trimethylsiloxy end-blocked dimethylpolysiloxanes, diethylpolysiloxanes, methylphenylpolysiloxanes, diphenylpolysiloxanes and copolymers thereof.

The aminofunctional silanes or siloxanes which are reacted with the organopolysiloxanes may be represented by the general formula

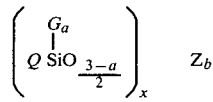

in which G represents the radicals, R, OR', OR'', NR'$_2$, or OSiR$_3$ in which R is the same as R above, R' represents hydrogen or monovalent hydrocarbon radicals having from 1 to 18 carbon atoms, R'' is a substituted or unsubstituted divalent hydrocarbon radical having from 1 to 18 carbon atoms, a substituted or unsubstituted divalent hydrocarbonoxy radical in which the oxygen is in the form of an ether linkage or an unsaturated divalent hydrocarbon radical, Q represents the radicals

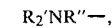

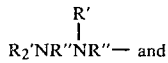

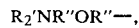

Z is a radical selected from the group consisting of R'O$_{0.5}$, R$_3$SiO$_{0.5}$ and R'$_2$NR''O$_{0.5}$, in which R, R' and R'' are the same as above, a is a number of from 0 to 2, b is a number of from 0 to 3 and x is a number of from 1 to 20,000.

Examples of suitable divalent radicals represented by R'' are hydrocarbon radicals having from 2 to 18 carbon atoms such as ethylene, trimethylene, tetramethylene, hexamethylene, octamethylene; hydrocarbonoxy radicals having the formula

in which r is a number of from 1 to 50 such as ethylene oxide, trimethylene oxide and polymers thereof and alkylene radicals such as vinylene, propenylene, butenylene, hexenylene and the like.

Examples of suitable aminofunctional silanes are betaaminopropyltriethoxysilane, gamma-aminopropyltrimethoxysilane, methyl-beta-(aminoethyl) gamma-aminopropyldimethoxysilane, omega-aminohexyltributoxysilane, beta-(aminoethoxy) hexyltriethoxysilane, beta-(aminopropoxy)butyltributoxysilane, methyl-beta-(aminopropoxy)propyldi-(aminoethoxy)silane,

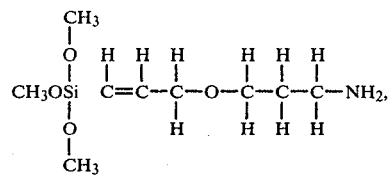

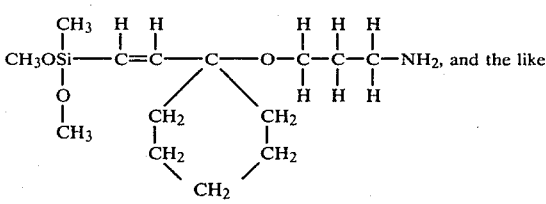

Representative examples of aminofunctional siloxanes are

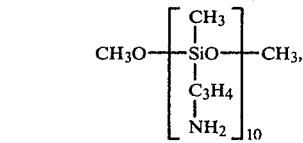

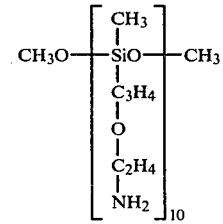

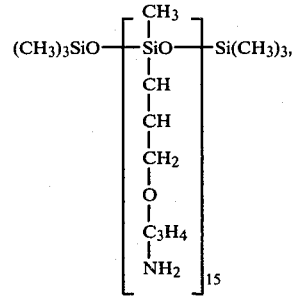

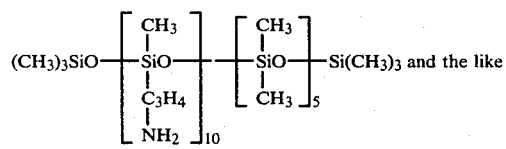

The aminofunctional silicone fluids and methods for preparing the same are described in U.S. Pat. No. 3,890,269 to Martin, which is incorporated herein by reference.

Other aminofunctional silicone fluids which may be used in the coating compositions of this invention are those obtained from the reaction of polyaminoalkyl alkoxysilanes of the formula

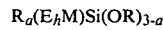

or the corresponding siloxanes with organosiloxanes of the general formula $R_ySi(OH)_mO_{4-m-y/2}$ where R is the same as above, M is an aliphatic hydrocarbon radical having from 1 to 10 carbon atoms and having a valence of h+1, where h is a number of from 1 to 3, E is a monovalent radical attached to M by a carbon-nitrogen bond and is composed of carbon, nitrogen and hydrogen atoms and contains at least one amine group, a is a number of from 0 to 2, m has a positive average value up to and including 2, and y is a number of from 0.5 to 2.49 and the sum of m and y has an average value up to and including 3.

These aminofunctional siloxane copolymers may be prepared by contacting the aminofunctional silanes or the corresponding siloxanes with the organosiloxane in a liquid phase in accordance with the procedure described in U.S. Pat. No. 3,355,424 to Brown. Generally, the reaction will proceed rather slowly at room temperature, however, the reaction rate may be accelerated by heating the reaction mixture at temperatures of from 50° to about 200° C.

Other aminofunctional silicone fluids which may be used are tertiary aminoorganosilanes or siloxanes which have at least one ether linkage in the organic group connecting the tertiary amino group to the silicon atoms. The tertiary aminoorganosiloxanes may be represented by the general formula

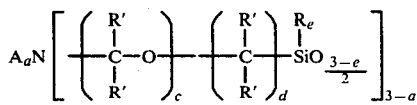

in which A is a monovalent hydrocarbon radical, a hydroxy terminated polyalkyleneoxy group, an alkenyloxy terminated polyalkyleneoxy group, a hydroxyalkyl group, a tertiary aminoalkyl group or a divalent group which, together with the nitrogen atom forms a heterocyclic ring, R is a monovalent hydrocarbon radical, R' is a monovalent hydrocarbon radical having from 1 to 18 carbon atoms or hydrogen, a is a number of from 0 to 2, c and d are each numbers of from 1 to 10 and e is a number of from 0 to 2.

These tertiary aminoorganosiloxanes may be prepared by a platinum catalyzed addition reaction of an alkenyl ether of a tertiary hydroxyalkyl aine and a hydrosilicon compound (i.e., a silane or siloxane containing silicon-bonded hydrogen) in accordance with the procedure described in U.S. Pat. No. 3,402,191 to Morehouse. Generally temperatures of from 100° C. to about 160° C. are preferred and solvents for the reactants (e.g., aromatic hydrocarbons such as ethylene glycol dimethyl ether) can be employed, particularly where the reactants are incompatible and/or it is desired to minimize cross-linking. It is preferred that the addition reaction be conducted under an atmosphere of an inert gas to minimize side reactions.

Other aminofunctional silicone fluids which may be used are those derived from the condensation and/or the partial hydrolysis and condensation of a liquid silanol chain-stopped polydiorganosiloxane having the formula

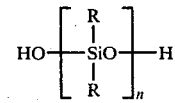

with various mol ratios of an aminoalkoxyalkylsilane or an aminoalkoxyalkenylsilane having the formula

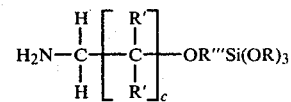

and, if desired, aminoalkylsilanes having the formula $H_2N(CH_2)_cSi(OR)_3$
or
$NH_2(CH_2)_cNH(CH_2)_cSi(OR)_3$ or from the condensation of the above liquid silanol chain-stopped polydiorganosiloxane with the above aminofunctional silanes in various mol ratios in which R, R' and c are the same as above and h is a number greater than 5 and R''' is a divalent alkylene radical having from 2 to 10 carbon atoms or a divalent alkenyl radical having from 3 to 8 carbon atoms and an olefinic bond on the carbon atom adjacent to the silicon atom. These aminofunctional organopolysiloxane copolymers may be prepared in accordance with the procedure described in U.S. Pat. No. 3,544,498 to Holdstock et al in which a mixture containing the silanol chain-terminated polyorganosiloxane and the aminoalkoxyalkylsilane or aminoalkyoxyalkenylsilane and, if desired, the aminoalkylsilane are partially hydrolyzed and condensed. Also, the aminofunctional organopolysiloxanes may be prepared in accordance with the procedure described in U.S. Pat. No. 3,355,424 to Brown in which an aminofunctional silane and silanol chain-stopped polyorganosiloxanes are condensed.

The viscosity of the aminofunctional silicone fluids employed in the coating compositions of this invention may range from about 5 up to about 100,000 cs. at 25° C., perferably from about 50 to 50,000 cs. and more preferably from about 100 to 20,000 cs. at 25° C.

Organopolysiloxanes (2) employed in the aqueous emulsion of this invention are organopolysiloxane fluids having the general formula:

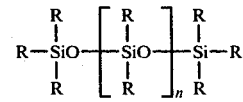

wherein the R(s), which may be the same or different, represent monovalent hydrocarbon radicals having from 1 to 18 carbon atoms and n is a number greater than 5.

Radicals represented by R are alkyl radicals, e.g., methyl, ethyl, propyl, butyl, octyl, dodecyl and octadecyl; aryl radicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl; alkaryl radicals, e.g., tolyl, xylyl, ethylphenyl; aralkyl radicals, e.g., benzyl, alpha-phenylethyl, beta-phenylethyl and alpha-phenylbutyl and the like.

The organopolysiloxane fluids may be either linear or branched chained siloxanes having an average of from 1.75 to 2.25 organic radicals per silicon atom. These organopolysiloxane fluids may have a viscosity of from 5 to 1,000,000 cs. at 25° C. and more preferably from 100 to 300,000 c. at 25° C. Also, it is possible to blend high and low viscosity fluids to form a fluid having the desired viscosity range.

Examples of suitable organopolysiloxane fluids which may be emulsified with the aminofunctional silicone fluids to provide a suitable vinyl coating are trialkylsiloxy end-blocked polydiorganosiloxanes such as trimethylsiloxy end-blocked polydimethylsiloxanes, triethylsiloxy end-blocked polydiethylsiloxanes, and copolymers having dimethylsiloxane units and diphenyl siloxane units or methylphenyl and dimethylsiloxane units. Preferably the organopolysiloxanes are trialkylsiloxy end-blocked polydiorganosiloxanes such as trimethylsiloxy end-blocked polydimethylsiloxanes. These organopolysiloxane fluids are well known in the art and consist predominately of diorganosiloxane units ($R_2SiO$).

Examples of nonionic surface-active agents which may be employed in the coating compositions of this invention are (a) octylphenoxy polyethoxy ethanol compounds containing from 1 to 13 mols of ethylene oxide (available as Triton X-Series from Rohm and Hass Company) and (b) the product obtained from the reaction of ethylene oxide and nonyl phenol in a molar ratio of 6:1 to 40:1 (available as Surfonic N-Series from Jefferson Chemical Company, Inc.). The Triton X-Series of surface-active agents are obtained from the reaction of octylphenol and ethylene oxide.

It has been found that when a mixture of these surface-active agents is employed in the coating compositions of this invention, an emulsion is obtained which is significantly better and more stable than emulsions prepared heretofore with any of the surface-active agents alone or in combination with other surface-active agents. Thus, when the octylphenoxy polyethoxy ethanol compound containing from 1 to 13 mols of ethylene oxide is used in combination with the surface-active agent obtained from the reaction of ethylene oxide and nonyl phenol in a molar ratio of from 6:1 to 40:1, a significantly better emulsion is obtained than could have been prepared with any of the individual surface-active agents.

The ratio of the surface-active agents is not critical and may range from about 10 percent by weight of the octylphenoxy polyethoxy ethanol compound to 90 percent by weight of the product obtained from the reaction of ethylene oxide and nonyl phenol to 90 percent by weight of octylphenoxy polyethoxy ethanol compound to 10 percent by weight of the product obtained from the reaction of ethylene oxide and nonyl phenol based on the total weight of the surface-active agents. Preferably the ratio of surface-active agents ranges from about 20 to 50 percent by weight of the octylphenoxy polyethoxy ethanol compound and from 80 to 50 percent by weight of the product obtained from the reaction of ethylene oxide and nonyl phenol, and more preferably from about 30 to 40 percent by weight of the octylphenoxy polyethoxy ethanol compound to about 70 to 60 percent by weight of the product obtained from the reaction of ethylene oxide and nonyl phenol based on the weight of the surface-active agents.

The amount of surface-active agents present in the coating composition may range from 2 to 10 percent, preferably from 3 to 8 percent and more preferably from 3 to 6 percent by weight based on the total weight of the composition, i.e., silicone fluids (1), surface-active agents (2) and water (3).

The silicone fluids are present in the coating composition in an amount of from 1 to 50 percent by weight, preferably from 10 to 40 percent by weight and more preferably from 20 to 35 percent by weight based on the weight of the composition; i.e., silicone fluids (1), surface-active agents (2) and water (3). For optimum results, the coating composition preferably contains from 25 to 35 percent by weight of silicone fluids based on the total weight of the composition. By silicone fluids we mean the aminofunctional silicone fluid (a) and the organopolysiloxane fluid (b).

The ratio of aminofunctional silicone fluid to organopolysiloxane fluid present in the silicone fluids is not critical and may be range from 1 percent by weight of aminofunctional silicone fluid to 99 percent by weight of organopolysiloxane fluid to 99 percent by weight of aminofunctional silicone fluid to 1 percent by weight of organopolysiloxane fluid based on the weight of the organopolysiloxane fluid and aminofunctional silicone fluid. Preferably the ratio of the aminofunctional silicone fluid ranges from 10 to 40 percent by weight and the amount of organopolysiloxane fluid ranges from 90 to 60 percent by weight based on the weight of the silicone fluid, i.e., the aminofunctional silicone fluid and organopolysiloxane fluid.

The balance of the composition is water which is present in an amount of from 97 to 44 percent by weight based on the total weight of the silicone fluids (1) surface-active agents (2) and water (3).

Other ingredients such as preservatives, e.g., formaldehyde and 6-acetoxy-2,4-dimethyl-m-dioxane, antifoams and coloring agents may be added in minor amounts to the composition of this invention.

The coating compositions of this invention may be prepared in an conventional manner. Preferably it is prepared in a mechanical mixing apparatus by adding the surface-active agents to a predetermined amount of water, the amount of water being equal to or less than the total weight of the surface-active agents, and thereafter adding the silicone fluids to the resulting emulsified blend to form a paste-like composition. Depending on the final concentration, the remaining amount of water is then slowly added to the thus formed paste-like composition with agitation to form a homogeneous composition.

The compositions of this invention may be applied to vinyl surfaces to improve their resistant to detergents. Also, these compositions impart a high gloss coating to the treated surfaces and protect the surfaces against environmental elements such as grease, dirt, water and road film.

In the following examples all parts are by weight unless otherwise specified.

PREPARATION OF AMINOFUNCTIONAL SILICONE FLUIDS (A) An aminofunctional silicone fluid is prepared by heating a mixture containing about 266.4 parts of octamethylcyclotetrasiloxane, 22.4 parts of beta-(aminoethyl)-gamma-aminopropyltrimethoxysilane and 0.29 part of potassium hydroxide to a temperature of 145° C. for three hours. After cooling the liquid product to room temperature 0.29 part of acetic acid is added to neutralize the catalyst. The product is filtered and a liquid product having a viscosity of about 40 cs. at 25° C. is recovered. Nuclear Magnetic Resonance (N.M.R.) analysis indicates that the ratio of beta-(aminoethyl)-gamma-aminopropyl to OCH$_3$ to (CH$_3$)$_2$SiO groups is about 1:3:36.

(B) An aminofunctional silicone fluid is prepared by reacting 9 parts of beta-(aminoethoxy)propyltrimethoxysilane, 316 parts of hexamethylcyclotrisiloxane and 0.3 part of n-butyllithium at a temperature of about 125° C. The resultant product which is neutralized with 0.3 part of acetic acid has a viscosity of about 125 cs. at 25° C. The ratio of beta-(aminoethoxy)propyl groups to OCH$_3$ groups to (CH$_3$)$_2$SiO groups is about 1:3.1:98.

(C) An aminofunctional silicone fluid is prepared by heating 129 parts of a hydrosiloxane having the average formula (CH$_3$)$_3$SiO[(CH$_3$)$_2$SiO]$_{8.5}$(CH$_3$HSiO)$_{3.5}$Si(CH$_3$)$_3$ with 25 parts of platinum per million parts by weight of the reactants as chloroplatinic acid. About 71 parts of the allyl ether of N,N-dimethylethanolamine having the formula (CH$_3$)$_2$NCH$_2$CH$_2$OCH$_2$CH=CH$_2$ is added dropwise while maintaining the reaction mixture at a temperature between about 150° and 158° C. The total time of addition is about 8 minutes. The reaction mixture is heated at 150° C. for an additional 3 hours, then sparged at this temperature for 40 minutes with nitrogen. The resulting product is amber in color and has a viscosity of about 90 cs. at 25° C.

(D) An aminofunctional silicone fluid is prepared by mixing 30 parts of a silanol chain-stopped polydimethylsiloxane of the formula $$\text{HO}\left[\begin{array}{c}\text{CH}_3\\|\\\text{SiO}\\|\\\text{CH}_3\end{array}\right]_5\text{H}$$

with 7.5 parts of 3-(3-aminopropoxy)propyltrimethoxysilane and about 12 parts of gamma-aminopropyltrimethoxysilane. The reaction mixture is thoroughly agitated and then 0.35 part of water is added with agitation. The resulting organopolysiloxane copolymer has a viscosity of about 150 cs. at 25° C.

(E) An aminofunctional silicone fluid is prepared by heating a mixture containing about 150 parts of a (polyaminoalkyl)alkoxysilane having the formula (CH$_3$O)$_3$Si(CH$_2$)$_3$NHCH$_2$CH$_2$NH$_2$ with about 50 parts of a polymer having the formula HO(CH$_3$O$_2$SiO[(CH$_3$)$_2$SiO]$_a$Si(CH$_3$)$_2$OH where the average value of a is such that the polymer contains about 3.5 percent OH groups to a temperature of about 150° C. under reflux conditions, cooled and then about 17.2 parts of water and about 150 parts of ethanol are added. About one third of the ethanol is removed by distillation. About 75 weight percent of the units of the resulting copolymer have the formula NH$_2$CH$_2$CH$_2$NH(CH$_2$)$_3$Si(OCH$_3$)$_x$O$_{3-z/2}$ and about 25 weight percent of the units are (CH$_3$)$_2$SiO. Theoretically the value of z is in the range of between 0 and 1.

EXAMPLE 1

A coating composition is prepared by adding 11.7 parts of water to a mechanical mixer containing 4 parts of octylphenoxy polyethoxy ethanol having 5 mols of ethylene oxide (available as Triton X-45 from Rohm and Haas Company) and 14 parts of the product obtained from the reaction of ethylene oxide with nonyl phenol in a molar ratio of 15 to 1 (available as Surfonic N-150 from Jefferson Chemical Co., Inc.). The ingredients are mixed until a paste-like composition is formed, then a mixture containing 105 parts of trimethylsiloxy end-blocked dimethylpolysiloxane fluid having a viscosity of 100 cs. at 25° C. and 35 parts of the aminofunctional silicone fluid prepared in accordance with (A) above, is added in increments over a period of about five minutes and after the addition is completed, the ingredients are mixed for an additional two minutes. An additional 110 parts of water are added in increments over a period of about 15 minutes with continuous agitation. The resultant composition is filtered and then centrifuged for 1 hour at 2,500 rpm without any apparent separation. A sample is heated for 15 days at 50° C., while a similar sample is subjected to 10 cycles of a freeze-thaw test at temperatures ranging from −20° to +25° C. without any apparent evidence of phase separation. A sample of the composition is applied to a vinyl surface and allowed to dry. After five washings with a detergent solution, the treated vinyl surface exhibits a high gloss and shows excellent water repellency.

EXAMPLE 2

The composition of Example 1 is diluted with water in a ratio of about 2.3 parts of the composition of Example 1 to 1 part of water and applied to a vinyl surface. The treated surface exhibits excellent gloss and water repellency after five washings with a detergent solution.

EXAMPLE 3

The composition of Example 2 is diluted with water in a ratio of about 1 part of the composition of Example 2 to 1.9 parts of water and applied to a vinyl surface. The treated surface exhibits excellent gloss and water repellency after five washings with a detergent solution.

EXAMPLE 4

The composition of Example 3 is diluted with water in a ratio of 1 part of the composition of Example 3 to 11 parts of water and applied to a vinyl surface. The treated surface still exhibits water repellency after one detergent wash.

EXAMPLE 5

The procedure of Example 1 is repeated except that the silicone fluid blend contains 33.6 parts of a trimethylsiloxy end-blocked dimethylpolysiloxane having a viscosity of 60,000 cs. at 25° C., 79.8 parts of a trimethylsiloxy end-blocked dimethylpolysiloxane having a viscosity of 100 cs. at 25° C. and 26.6 parts of aminofunctional silicone fluid prepared in accordance with (A) above. The resultant composition exhibits good stability with respect to heat aging, and the freeze-thaw tet. Vinyl surfaces treated with the composition exhibit high gloss and shown excellent resistance to detergent washings.

EXAMPLE 6

The procedure of Example 1 is repeated except that 35 parts of the aminofunctional silicone fluid prepared in (B) above is substituted for the aminofunctional silicone fluid described in (A) above. The resultant composition is stable in the freeze-thaw test and on heat aging. When the composition is applied to a vinyl surface, a high gloss film is formed which shows excellent water repellency.

EXAMPLE 7

The procedure of Example 1 is repeated except that 35 parts of the aminofunctional silicone fluid prepared in (C) above is substituted for the aminofunctional silicone fluid described in (A) above. The resultant composition is stable in the freeze-thaw test and on heat aging. When the composition is applied to a vinyl surface, a high gloss film is formed which shows excellent water repellency.

EXAMPLE 8

The procedure of Example 1 is repeated except that 35 parts of the aminofunctional silicone fluid prepared in (D) above is substituted for the aminofunctional silicone fluid described in (A) above. The resultant composition is stable in the freeze-thaw test and on heat aging. When the composition is applied to a vinyl surface, a high gloss film is formed which shows excellent water repellency.

EXAMPLE 9

The procedure of Example 1 is repeated except that 35 parts of the aminofunctional silicone fluid prepared in (E) above is substituted for the aminofunctional silicone fluid described in (A) above. The resultant composition is stable in the freeze-thaw test and on heat aging. When the composition is applied to a vinyl surface, a high gloss film is formed which shows excellent water repellency.

COMPARISON EXAMPLE V₁

The procedure of Example 1 is repeated except that the aminofunctional silicone fluid is omitted and 140 parts of a trimethylsiloxy end-blocked dimethylpolysiloxane having a viscosity of 100 cs. at 25° C. are used. When the resultant composition is applied to a vinyl surface, it forms a continuous film which is easily removed with a single detergent wash.

COMPARISON EXAMPLE V₂

The procedure of Example V₁ is repeated except that 140 parts of an aminofunctional fluid prepared in accordance with (A) above, is substituted for the dimethylpolysiloxane fluid. When the resultant composition is applied to a vinyl surface, it does not form a continuous film and is easily removed with a detergent wash.

COMPARISON EXAMPLE V₃

The procedure of Example 1 is repeated except that the octylphenoxy polyethoxy ethanol compound (Triton X-45) is omitted and 18 parts of the product obtained from the reaction of ethylene oxide with nonyl phenol in a molar ratio of 15 to 1 is used. The resultant composition separates into two phases in the first cycle of the freeze-thaw test. Also, in the heat aging test the composition separates into two phases.

COMPARISON EXAMPLE V₄

The procedure of Example 1 is repeated except that the product obtained from the reaction of ethylene oxide with nonyl phenol in a molar ratio of 15:1 (Surfonic N-150) is omitted and 18 parts of octylphenoxy polyethoxy ethanol (Triton X-45) is used. The resultant composition separates into two phases on heat aging and in the first cycle of the freeze-thaw test.

What is claimed is:

1. A detergent resistant vinyl coating composition consisting essentially of (1) from 1 to 50 percent by weight based on the weight of the composition of silicone fluids consisting essentially of (a) from 1 to 99 percent by weight based on the weight of the mixture of silicone fluids of an aminofunctional silicone fluid and (b) an organopolysiloxane fluid, (2) from 2 to 10 percent by weight based on the weight of the composition of nonionic surface-active agents consisting essentially of a mixture of (a) from 10 to 90 percent by weight based on the weight of the mixture of surface-active agents of octylphenoxy polyethoxy ethanol compound containing from 1 to 13 mols of ethylene oxide and (b) the product obtained from the reaction of ethylene oxide and nonyl phenol in a molar ratio of from 6:1 to 40:1 and the balance of the composition being (3) water.

2. The composition of claim 1 wherein the aminofunctional silicone fluid (a) is obtained from the equilibration of an organopolysiloxane and an aminofunctional silane or siloxane in the presence of a basic catalyst.

3. The composition of claim 1 wherein (1) the silicone fluids are present in an amount of from 25 to 35 percent by weight, (2) the surface-active agents are present in an amount of from 2 to 6 percent by weight and (3) water is present in an amount of from 73 to 59 percent by weight based on the weight of the composition.

4. The composition of claim 1 wherein the surface-active agents (2) consists of (a) from 20 to 50 percent by weight of octylphenoxy polyethoxy ethanol having from 1 to 13 mols of ethylene oxide and (b) from 80 to 50 percent by weight based on the weight of the mixture of surface active agents of the product obtained from the reaction of ethylene oxide and nonyl phenol in a molar ratio of from 6:1 to 40:1.

5. The composition of claim 2 wherein the organopolysiloxane used in the preparation of the aminofunctional silicone fluid is represented by the formula

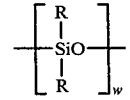

in which R is a monovalent hydrocarbon radical having from 1 to 18 carbon atoms and w is a number of from 3 to 10.

6. The composition of claim 2 wherein the organopolysiloxane used in the preparation of the aminofunctional silicone fluid is represented by the formula

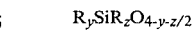

in which R is a monovalent hydrocarbon radical, y is a number of from about 0.5 to 3.0, z is a number of from 0.001 to 1 and the sum of y and z is a number of from 1 to 3.0.

7. The composition of claim 2 wherein the aminofunctional silane or siloxane is represented by the formula

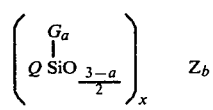

in which G is selected from the group consisting of R, OR', OSiR$_3$ and OR"NR'$_2$ in which R is a monovalent hydrocarbon radical having from 1 to 18 carbon atoms, R' is selected from the group consisting of hydrogen and monovalent hydrocarbon radicals having from 1 to 18 carbon atoms, R" is selected from the group consisting of substituted and unsubstituted divalent hydrocarbon radicals, substituted and unsubstituted divalent hydrocarbonoxy radicals in which the oxygen is in the form of an ether linkage and unsaturated divalent substituted and unsubstituted hydrocarbon radicals, Q is selected from the group consisting of

R$_2$'NR"—,

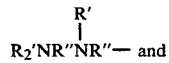

R$_2$'NR"OR"—,

Z is selected from the class consisting of R'O$_{0.5}$, R$_3$SiO$_{0.5}$ and R'NR"O$_{0.5}$, a is a number of from 0 to 2, b is a number of from 0 to 3 and x is a number of from 1 to 20,000.

8. The composition of claim 1 wherein the aminofunctional silicone fluid is obtained from the reaction of beta-aminoethyl-gamma-aminopropyltrimethoxysilane and a silanol chain-stopped dimethylpolysiloxane.

9. The composition of claim 1 wherein the aminofunctional silicone compound is present in an amount of from 15 to 40 percent by weight based on the total weight of the aminofunctional silicone fluid and the organopolysiloxane fluid.

10. The composition of claim 1 wherein the organopolysiloxane fluid is polydimethylsiloxane.

11. The composition of claim 1 wherein the aminofunctional silicone fluid is obtained from the reaction of (polyaminoalkyl)alkoxysilanes of the formula R$_a$(E$_h$M)Si(OR)$_{3-a}$ or siloxanes thereof with organopolysiloxanes of the formula R$_y$Si(OH)$_m$O$_{4-m-y/2}$ in which R is a monovalent hydrocarbon radical having from 1 to 18 carbon atoms, M is an aliphatic hydrocarbon radical having from 1 to 10 carbon atoms and having a valence of h+1, h is a number of from 1 to 3, E is a monovalent radical attached to M by a carbon-nitrogen bond and is composed of carbon, nitrogen and hydrogen atoms and contains at least one amine group, a is a number of from 0 to 2, m has a positive average value up to and including 2 and y is a number of from 0.5 to 2.49 and the sum of m and y is an average value up to and including 3.

12. The composition of claim 1 wherein the aminofunctional silicone fluid is obtained from the hydrolysis and condensation of a liquid polydiorganopolysiloxane having the formula

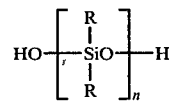

and a silane selected from the group consisting of an aminoalkoxy-alkylsilane and an aminoalkoxyalkenylsilane of the formula

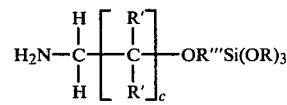

in which R is a monovalent hydrocarbon radical having from 1 to 18 carbon atoms, R' is selected from the group consisting of hydrogen and monovalent hydrocarbon radicals having from 1 to 18 carbon atoms, R'" is selected from the group consisting of divalent alkylene radicals having from 2 to 10 carbon atoms and divalent alkenyl radicals having from 3 to 10 carbon atoms and an olefinic bond on the carbon atoms adjacent to the silicon atom, c is a number of from 1 to 10 and n is a number greater than 5.

13. The composition of claim 12 wherein the silane includes an aminoalkylsilane of the formula H$_2$N(CH$_2$)$_c$Si(OR)$_3$ in which R is a monovalent hydrocarbon radical having from 1 to 18 carbon atoms and c is a number of from 1 to 10.

14. The composition of claim 12 wherein the silane includes beta(aminoethyl)gamma-aminopropyl trimethyloxysilane.

15. The composition of claim 1 wherein the aminofunctional silicone fluid is a tertiary aminoorganosiloxane of the general formula

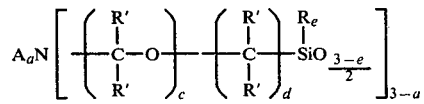

in which A is selected from the group consisting of monovalent hydrocarbon radicals having from 1 to 18 carbon atoms, hydroxy terminated polyalkylenoxy groups, alkenyloxy terminated polyalkyleneoxy groups, hydroxyalkyl groups, tertiary aminoalkyl groups and divalent groups which together with the nitrogen atom forms a heterocyclic ring containing only carbon and nitrogen, with hydrogen as the only substituent on the ring or only carbon, nitrogen and oxygen with hydrogen as the only substituent on the ring, R is a monovalent hydrocarbon radical having from 1 to 18 carbon atoms, R' is selected from the group consisting of hydrogen and monovalent hydrocarbon radicals having from 1 to 18 carbon atoms, a is a number of from 0 to 2, c and d are each numbers of from 1 to 10 and e is a number of from 0 to 2, said tertiary aminoorganosiloxane is obtained from the platinum catalyzed addition reaction of an alkenyl ether or a tertiary hydroxyalkylamine and a silicon compound selected from the group consisting of silanes and siloxanes containing silicon bonded hydrogen.

16. A method for treating a vinyl surface to impart detergent resistant properties thereon which comprises applying the coating composition of claim 1 to the vinyl surface.

* * * * *